US012242679B2

(12) United States Patent
Shimizu

(10) Patent No.: US 12,242,679 B2
(45) Date of Patent: Mar. 4, 2025

(54) ELECTRONIC DEVICE WITH A ROTATIONAL OPERATION MEMBER CONTROLLED ACCORDING TO TYPE OF ITEMS DISPLAYED AND CONTROL METHOD

(71) Applicant: CANON KABUSHIKI KAISHA, Tokyo (JP)

(72) Inventor: Rurika Shimizu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 18/295,904

(22) Filed: Apr. 5, 2023

(65) Prior Publication Data
US 2023/0333675 A1 Oct. 19, 2023

(30) Foreign Application Priority Data
Apr. 14, 2022 (JP) ................. 2022-067121

(51) Int. Cl.
| | | |
|---|---|---|
| *G06F 3/0362* | (2013.01) | |
| *G06F 3/01* | (2006.01) | |
| *G06F 3/0482* | (2013.01) | |
| *H04N 23/63* | (2023.01) | |

(52) U.S. Cl.
CPC ............ *G06F 3/0362* (2013.01); *G06F 3/016* (2013.01); *G06F 3/0482* (2013.01); *H04N 23/631* (2023.01)

(58) Field of Classification Search
CPC ...... G06F 3/0362; G06F 3/016; G06F 3/0482; H04N 23/631
See application file for complete search history.

(56) References Cited

U.S. PATENT DOCUMENTS

| | | | |
|---|---|---|---|
| 10,367,994 B2 * | 7/2019 | Fujimura | H04N 23/60 |
| 11,843,853 B2 * | 12/2023 | Miyazaki | H04N 5/9201 |
| 2010/0271341 A1 | 10/2010 | Nagashima et al. | |
| 2012/0287328 A1 | 11/2012 | Kawai et al. | |
| 2015/0091881 A1 * | 4/2015 | Onaka | G06F 3/165 |
| | | | 345/184 |
| 2020/0310609 A1 * | 10/2020 | Ham | G06F 3/0484 |
| 2021/0314492 A1 * | 10/2021 | Miyazaki | H04N 23/50 |
| 2022/0011888 A1 * | 1/2022 | Kim | G06F 3/041 |

FOREIGN PATENT DOCUMENTS

| | | | |
|---|---|---|---|
| JP | 2003228455 A | | 8/2003 |
| JP | 2005303581 A | | 10/2005 |
| JP | 2005-326961 A | | 11/2005 |
| JP | 2010262561 A | | 11/2010 |
| JP | 2013-083866 A | | 5/2013 |

OTHER PUBLICATIONS

The above patent documents were cited in a United Kingdom Search Report issued on Sep. 14, 2023, that issued in the corresponding UK Patent Application No. GB2304010.8.
The above patent documents were cited in a Japanese Office Action issued on Mar. 4, 2024, with a machine translation, that issued in the corresponding Japanese Patent Application No. 2022-067121.

* cited by examiner

*Primary Examiner* — Afroza Chowdhury
(74) *Attorney, Agent, or Firm* — Cowan, Liebowitz & Latman, P.C.

(57) ABSTRACT

An electronic device comprises a rotational operation member and a control unit that controls an angle of rotation per operation of the rotational operation member. The control unit controls the angle of rotation per operation in accordance with a plurality of items displayed on a display unit.

27 Claims, 8 Drawing Sheets

4 IMAGES: 360 ÷ 4 = 90 DEGREES > 45 DEGREES

36 IMAGES: 360 ÷ 36 = 10 DEGREES

100 IMAGES: 360 ÷ 100 = 3.6 DEGREES < 5 DEGREES

ELECTRONIC DEVICE WITH A ROTATIONAL OPERATION MEMBER CONTROLLED ACCORDING TO TYPE OF ITEMS DISPLAYED AND CONTROL METHOD

This application claims the benefit of Japanese Patent Application No. 2022-067121, filed Apr. 14, 2022 which is hereby incorporated by reference herein in its entirety.

BACKGROUND OF THE INVENTION

Field of the Invention

The present invention relates to an electronic device and a control method for an electronic device.

Description of the Related Art

Rotational operation members, such as dials, are commonly used as operation members for operating and changing settings of an electronic device. Some rotational operation members are provided with a mechanism that allows a user to tactually sense a response (a clicking or detent sensation (feeling)) from the rotational operation member at the time of rotation by applying a mechanical vibration or rotational resistance for each predetermined rotation amount or for rotation in a predetermined direction (Japanese Patent Laid-Open No. 2013-83866).

Conventionally, an angle of rotation (hereinafter, click angle) that corresponds to input sensitivity per operation of rotational operation member and at which a clicking sensation is applied is fixed. Therefore, when selecting a desired item from a list of items in which a plurality of items are displayed by operating the rotational operation member, it is necessary to operate the rotational operation member for at least an amount of rotation corresponding to the number of displayed items until the desired item is reached. This means that when a user selects an item by operating the rotational operation member, the greater the number of displayed items, the greater an amount of operation until the desired item is reached in the list of items; however, Japanese Patent Laid-Open No. 2013-83866 does not mention a method for solving such a problem.

SUMMARY OF THE INVENTION

The present invention has been made in consideration of the aforementioned problems, and realizes techniques for improving an operability of a rotational operation member for when selecting a desired item from a list of items in which a plurality of items are displayed.

In order to address the aforementioned problems, the present invention provides an electronic device comprising: a rotational operation member; and a control unit configured to control an angle of rotation per operation of the rotational operation member, wherein the control unit controls the angle of rotation per operation in accordance with a plurality of items displayed on a display unit.

In order to address the aforementioned problems, the present invention provides a method of controlling an electronic device having a rotational operation member, the method comprising: controlling an angle of rotation per operation of the rotational operation member, wherein the controlling controls the angle of rotation per operation in accordance with a plurality of items displayed on a display unit.

In order to address the aforementioned problems, the present invention provides a non-transitory computer-readable storage medium storing a program for causing a processor to function as an electronic device comprising: a rotational operation member; and a control unit configured to control an angle of rotation per operation of the rotational operation member, wherein the control unit controls the angle of rotation per operation in accordance with a plurality of items displayed on a display unit.

According to the present invention, it is possible to improve operability of a rotational operation member for when selecting a desired item from a list of items in which a plurality of items are displayed.

Further features of the present invention will become apparent from the following description of exemplary embodiments (with reference to the attached drawings).

DESCRIPTION OF THE EMBODIMENTS

Figure 1:
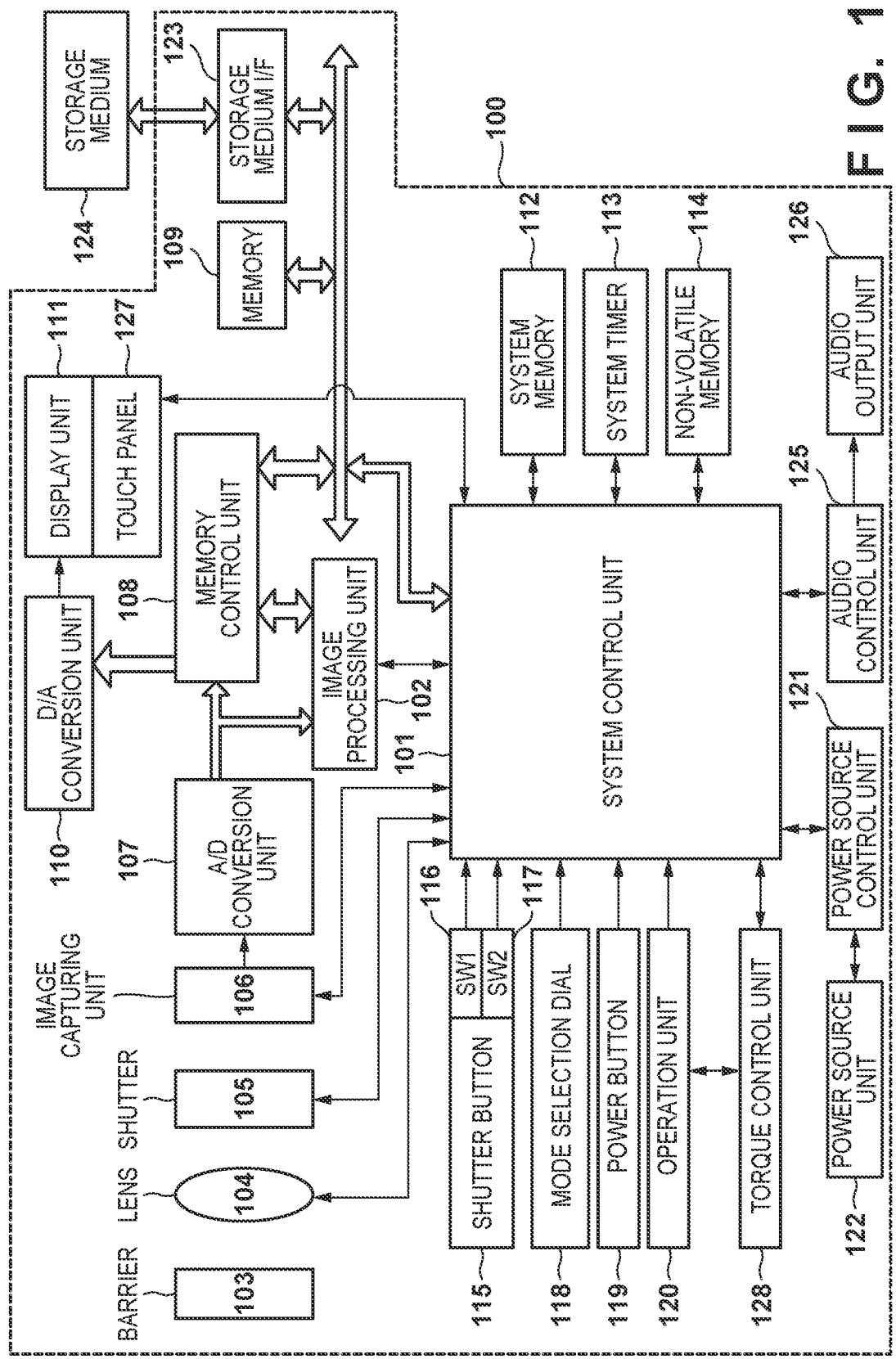
FIG. 1 is a block diagram illustrating a configuration of a digital camera according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, an embodiment in which an electronic device of the present invention is applied to an image capturing apparatus, such as a digital camera, will be described in detail with reference to the accompanying drawings. The electronic device of the present invention is not limited to the image capturing apparatus and is applicable to, for example, an apparatus comprising an operation member that is, in any way, capable of rotational operation (hereinafter, rotational operation member), such as a tablet PC or smartphone. Further, the present invention is also applicable to a mouse for operating an information processing apparatus, such as a desktop PC; a remote control unit for remotely operating an electronic device; and the like.

<APPARATUS CONFIGURATION> First, a configuration and functions of the digital camera of the present embodiment will be described with reference to FIGS. 1 and 2.

Figure 2:
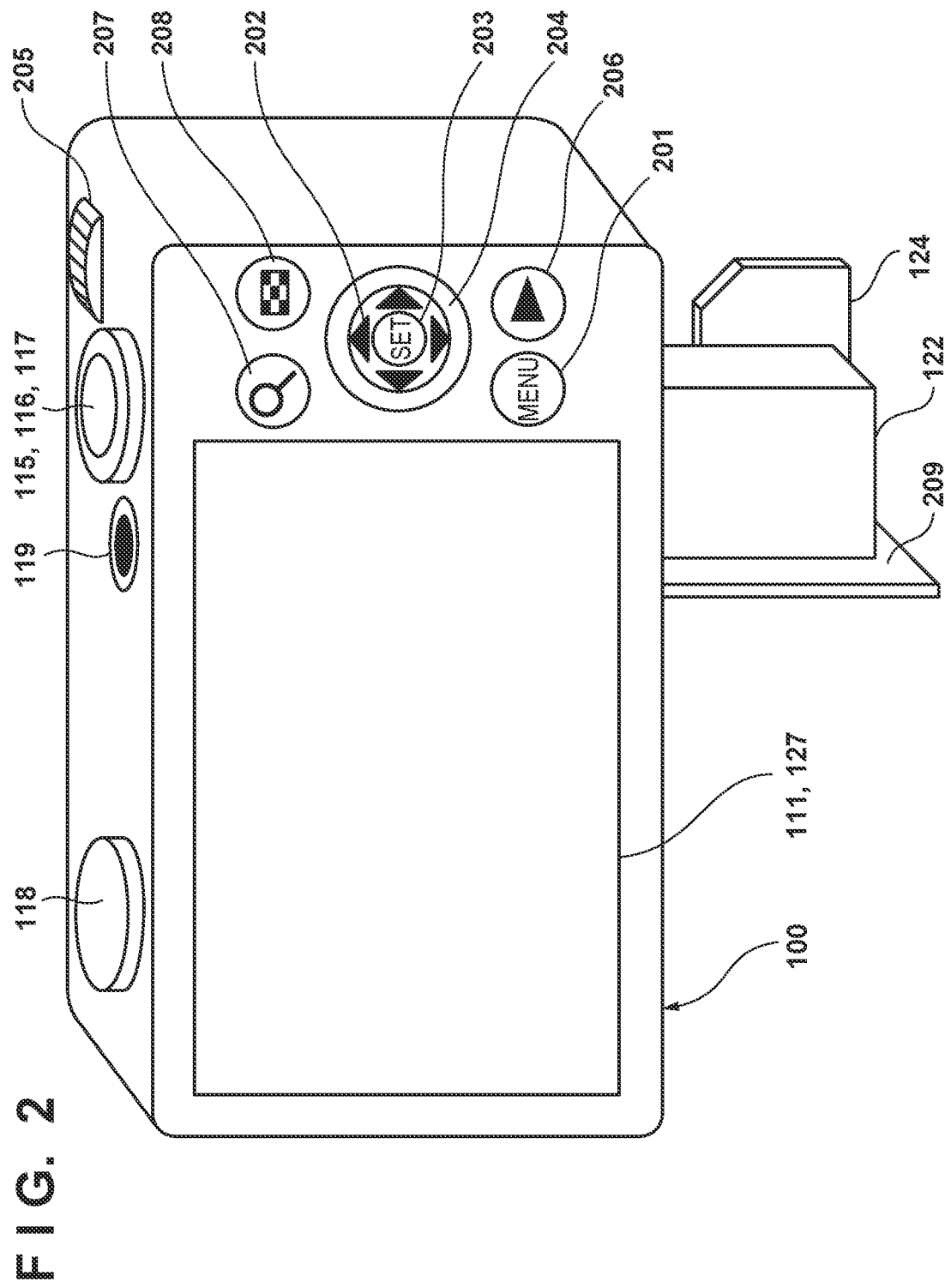
FIG. 2 is an external view of the digital camera according to the present embodiment.

FIG. 1 is a block diagram illustrating a configuration of the digital camera according to the present embodiment. FIG. 2 is an external view of the digital camera according to the present embodiment.

An image shooting lens 104 is a group of lenses including a zoom lens and a focus lens. A shutter 105 is a shutter provided with an aperture function. An image capturing unit 106 is an image sensor comprising a CCD, CMOS, or the like for converting an optical image into an electric signal. An A/D conversion unit 107 converts an analog signal into a digital signal. The A/D conversion unit 107 is used for converting an analog signal outputted from the image capturing unit 106 to a digital signal. A barrier 103 prevents an image capturing system including the image shooting lens 104, the shutter 105, and the image capturing unit 106 from getting dirty or damaged by covering the image capturing system including the image shooting lens 104 of a digital camera 100.

An image processing unit 102 performs predetermined pixel interpolation; resizing processing, such as reduction; and color conversion processing on data from the A/D conversion unit 107 or data from a memory control unit 108. In the image processing unit 102, predetermined computational processing is performed using captured image data, and a system control unit 101 performs exposure control and distance measuring control based on the obtained computational result. Through-the-lens (TTL) type automatic focus (AF) processing, automatic exposure (AE) processing, and pre-flash (EF) processing are thus performed. Furthermore, in the image processing unit 102, predetermined computational processing is performed using captured image data, and TTL type automatic white balance (AWB) processing is performed based on the obtained computational result.

Output data from the A/D conversion unit 107 is directly written into a memory 109 via the image processing unit 102 and the memory control unit 108 or via the memory control unit 108. The memory 109 stores image data obtained by the image capturing unit 106 and then converted into digital data by the A/D conversion unit 107 and image data for display on a display unit 111. The memory 109 has sufficient storage capacity for storing a predetermined number of still images and a predetermined amount of time of a moving image and audio. The memory 109 also serves as a memory (video memory) for image display.

A D/A conversion unit 110 converts data for image display stored in the memory 109 into an analog signal and supplies it to the display unit 111. The data for image display written in the memory 109 is thus displayed by the display unit 111 via the D/A conversion unit 110.

The display unit 111 performs a display in accordance with an analog signal from the D/A conversion unit 110 on a display device, such as a liquid crystal or organic EL display device. The display unit 111 functions as an electronic viewfinder (EVF) and displays a through image (live view image) by a digital signal which has been A/D-converted once by the A/D conversion unit 107 and stored in the memory 109, being D/A-converted into an analog signal by the D/A conversion unit 110, and the analog signal being successively transferred to and displayed on the display unit 111.

A non-volatile memory 114 is an electrically-erasable/recordable memory, and an EEPROM or the like, for example, is used. The non-volatile memory 114 stores constants, programs, and the like for operation of the system control unit 101. Here, the programs are for executing various flowcharts to be described later in the present embodiment.

The system control unit 101 includes a processor that controls the entire digital camera 100. The system control unit 101 realizes each process of the present embodiment to be described later by executing the programs stored in the non-volatile memory 114. A RAM is used for a system memory 112. In the system memory 112, constants, variables, programs read from the non-volatile memory 114 for operation of the system control unit 101, and the like are loaded. The system control unit 101 also performs display control by controlling the memory 109, the D/A conversion unit 110, the display unit 111, and the like.

A system timer 113 is a time measuring unit for measuring time to be used for various kinds of control and time of a built-in clock.

A shutter button 115, a mode selection dial 118, a power button 119, and an operation unit 120 are operation members for inputting various operation instructions to the system control unit 101.

The mode selection dial 118 is an operation member for inputting an operation instruction for switching an operation mode of the system control unit 101 to a still image shooting mode, a moving image recording mode, a reproduction mode, and a detailed mode included in each operation mode.

A first shutter switch 116 is turned on by a so-called half-press (image shooting preparation instruction), which is halfway through an operation of the shutter button 115 provided in the digital camera 100, and generates a first shutter switch signal SW1. Operations, such as, automatic focus (AF) processing, automatic exposure (AE) processing, automatic white balance (AWB) processing, and pre-flash (EF) processing, are started by the first shutter switch signal SW1.

A second shutter switch 117 is turned on by a so-called full press (image shooting instruction), which is completion of an operation of the shutter button 115, and generates a second shutter switch signal SW2. The system control unit 101 starts a series of image shooting processing operations from readout of a signal from the image capturing unit 106 to writing of image data to a storage medium 124 in accordance with the second shutter switch signal SW2.

A power control unit 121 is comprised of a battery detection circuit, a DC-DC converter, a switching circuit for switching among blocks to be energized, and the like and detects a state of the power button 119, whether a battery is mounted, a type of battery, and a remaining amount of battery. In addition, the power control unit 121 supplies a necessary voltage to each component including the storage medium 124 for a necessary period by controlling the DC-DC converter based on the detection result and an instruction of the system control unit 101.

A power source unit 122 is a primary battery, such as an alkaline battery or lithium battery, and a secondary battery, such as an NiCd battery, NiMH battery, or Li ion battery, but may also be an AC adaptor or the like.

A storage medium interface (I/F) 123 is an interface with the storage medium 124, such as a memory card or hard disk. The storage medium 124 is a storage medium, such as a memory card for recording a shot image, and is comprised of a semiconductor memory, magnetic disk, or the like.

An audio control unit 125 converts audio data inputted by a microphone or the like into a digital signal and stores it in the storage medium 124 as well as reads audio data stored in the storage medium 124 and outputs it from an audio output unit 126, such as a speaker. The audio control unit 125 can record audio data in synchronization with moving image data in a moving image recording mode and record audio data to be attached to still image data in the still image shooting mode. The audio control unit 125 can generate audio data for issuing a notification, such as a warning, and sound it from the audio output unit 126.

Each operation member of the operation unit 120 is appropriately assigned a function for each situation, for example, by an operation of selecting from various function icons displayed on the display unit 111 and acts as various function buttons. Function buttons include, for example, an end button, return button, image feed button, jump button, narrow-down button, attribute change button, and the like. For example, when a menu button 201 illustrated in FIG. 2 is pressed, a menu screen allowing various settings is displayed on the display unit 111. The user can intuitively perform various settings using the menu screen displayed on the display unit 111 and a directional button 202 provided with buttons in four directions of up, down, left, and right and a set button 203.

A controller wheel 204 and an electronic dial 205 are rotational operation members included in the operation unit 120 and are used together with the directional button, for example, for when instructing a selection item.

The electronic dial 205 includes a torque control unit 128 for variably controlling vibration or rotational resistance (torque) to be applied to the electronic dial 205 for each predetermined direction and angular position so that the user can tactually sense a response (a clicking or detent sensation (feeling)) from the electronic dial 205 at the time of rotation. The predetermined direction and predetermined angular position correspond to, for example, a direction in which a setting value, which has been assigned for each predetermined angular position, increases or decreases and the number and positions of and intervals between (division of) values that can be set. The torque control unit 128 includes a small motor connected to a rotational shaft of the electronic dial 205 and an encoder that detects an angle of rotation of the rotational shaft of the electronic dial 205 and changes a clicking sensation to be produced when the electronic dial 205 is rotated by changing a magnitude of a torque of the motor in accordance with the angle of rotation of the electronic dial 205. For example, when rotating the electronic dial 205 in a direction away from a predetermined position, the response from the electronic dial 205 will feel heavy to the user due to the torque of the motor being applied in a direction opposite to a direction of rotation of the electronic dial 205, and when rotating the electronic dial 205 in a direction approaching the predetermined position, the response from the electronic dial 205 that the user feels will be an attraction toward the predetermined position due to the torque of the motor being applied in the same direction as the direction of rotation. In a case where a predetermined position is provided at every predetermined angle, if torque control for when the motor is rotated is performed smoothly and continuously, the user can tactually sense a clicking sensation at each predetermined angle as the response at the time of rotation of the electronic dial 205. Further, it is possible to change a strength (intensity) of the clicking sensation by changing the torque of the motor. In this case, when a predetermined angle or predetermined position is defined as a click angle, it is possible to electrically variably control the click angle of the electronic dial 205. The method of providing a clicking sensation to the electronic dial 205 in the present embodiment is not limited to the above-described method and may be, for example, a method described in Japanese Patent Laid-Open No. 2013-83866 or another method.

The system control unit 101 executes processing for controlling the angle of rotation (input angle) that corresponds to input sensitivity per operation of the electronic dial 205, which will be described later in FIG. 3, (hereinafter, input angle control processing) by controlling the torque control unit 128. Further, the torque control unit 128 monitors the rotation speed of the electronic dial 205, and the system control unit 101 determines a start of rotation (operation start), a stop of rotation (operation stop), and an increase or decrease of the rotation speed of the electronic dial 205 based on the rotation speed of the electronic dial 205 and executes input angle control processing, which will be described later, in accordance with a result of the determination.

The torque control unit 128 is capable of controlling the input angle of the electronic dial 205 and of controlling the clicking sensation applied to the electronic dial 205 for each input angle. The input angle of the electronic dial 205 corresponds to, for example, each of angles $\theta n$ obtained by dividing one revolution of the electronic dial 205 (360 degrees) into a plurality of angles $\theta n$; however, the present invention is not limited a case where the angles $\theta n$ are of the same angle and, in some cases, may be controlled to be of different angles.

A bottom surface portion of the digital camera 100 is provided with a housing unit for the power source unit 122 and the storage medium 124 which can be opened and closed by a cover 209, and the power source unit 122 and the storage medium 124 can be attached to or detached from the digital camera 100 by opening and closing the cover.

A reproduction button 206 can switch between the camera's image shooting mode and reproduction mode. In the reproduction mode, when an enlargement button 207 is pressed in a state where one image is displayed on the display unit 111, the image displayed on the display unit 111 can be displayed in an enlarged manner, and when the enlargement button 207 is pressed a plurality of times, an enlargement magnification of the image increases in accordance with the number of presses. By operating the directional button 202, the controller wheel 204, and the electronic dial 205 an enlarged state, it is possible to move an enlarged range displayed on the display unit 111. Further, by pressing a reduction button 208 in the enlarged state of the image, it is possible to reduce the enlargement magnification of the enlarged image. When the reduction button 208 is pressed in a state in which one image is displayed on the display unit 111, so-called index reproduction in which a plurality of reduced images are displayed at once on the display unit 111 is performed. When the reduction button 208 is pressed a plurality of times, the number of images to be displayed at a time increases in accordance with the number of presses. Also, in an index reproduction state, a currently-selected current image is indicated by a cursor being displayed in a periphery of a reduced image. At this time, by operating the directional button 202, the controller wheel 204, and the electronic dial 205, it is possible to change the current image. In addition, the number of images of the change from the current image due to one rotational operation may be changed according to a setting. When the enlargement button 207 is pressed in the index reproduction state, it is possible to reduce the number of images to be displayed on the display unit 111.

A touch panel 127 capable of detecting contact with the display unit 111 is provided as part of the operation unit 120. The touch panel 127 and the display unit 111 may be integrally formed. For example, the touch panel 127 is configured such that its light transmittance does not interfere with display of the display unit 111 and so as to be mounted on an upper layer of a display surface of the display unit 111.

In addition, input coordinates on the touch panel 127 are associated with display coordinates on the display unit 111. This makes it possible to configure a graphical user interface (GUI) in which it appears as though the user is able to directly operate a screen displayed on the display unit 111. The system control unit 101 can detect the following operations on the touch panel: touching of the touch panel with a finger or pen (hereinafter, touch-down), a state in which the touch panel is being touched with a finger or pen (hereinafter, touch-on), moving of a finger or pen while touching the touch panel (hereinafter, move), lifting of a finger or pen that has been touching the touch panel (hereinafter, touch-up), and a state in which nothing is touching the touch panel (hereinafter, touch-off). These operations and positional coordinates on which a finger or pen is touching the touch panel are notified to the system control unit 101 via an internal bus, and the system control unit 101 determines what type of operation has been performed on the touch panel based on the notified information. Regarding the move, it is also possible to determine a direction of movement of a finger or pen moving on the touch panel for each of a vertical component and horizontal component on the touch panel based on a change of positional coordinates. In addition, it is assumed that a stroke has been drawn when a touch-up is performed after a touch-down and a certain move are performed on the touch panel. The operation of quickly drawing a stroke is called a flick. The flick is an operation of moving a finger quickly over a certain distance while touching the touch panel, and then simply lifting the finger, and in other words, is an operation of swiftly performing a trace over the touch panel as though flicking with a finger. When it is detected that a move has been performed a predetermined distance or more at a predetermined speed or more, directly followed by a touch-up, it can be determined that a flick has been performed. In addition, assume that it is determined that a drag has been performed when it is detected that a move has been performed for a predetermined distance or more at a predetermined speed or less. It is also possible to detect an operation of entering a specific area while moving a finger or pen on the touch panel (hereinafter, move-in) and an operation of exiting a specific area while moving (hereinafter, move-out). Any of various types of touch panel, such as a resistive film, surface acoustic wave, electrostatic capacitance, infrared, electromagnetic induction, image recognition, or optical sensor touch panel, may be used as the touch panel.

<Input Angle Control Processing> Next, processing for controlling the input angle of the electronic dial 205 according to the present embodiment will be described with reference to FIGS. 3 to 5C.

Figure 3:
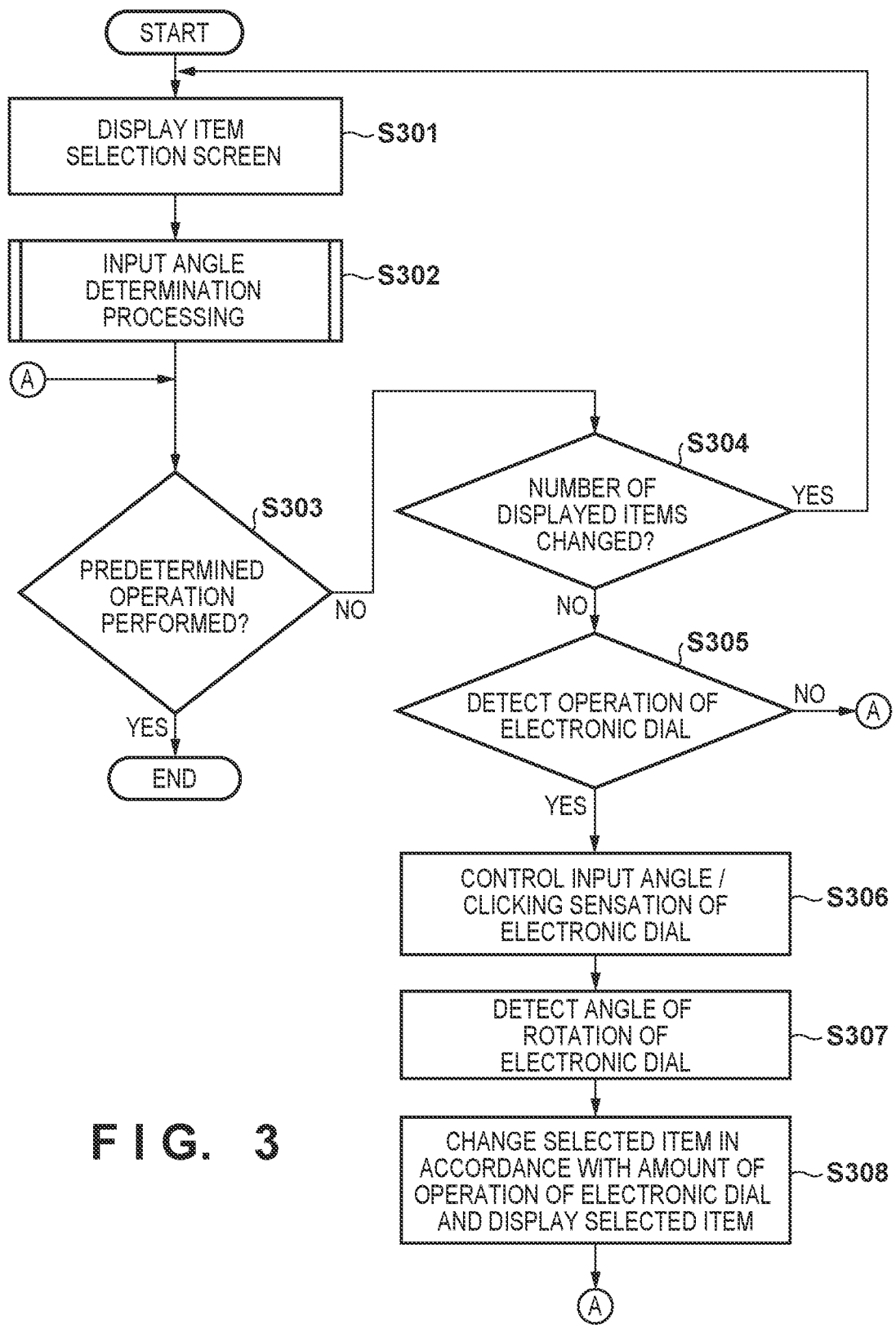
FIG. 3 is a flowchart illustrating processing for controlling an input angle according to the present embodiment.
Figure 4A:
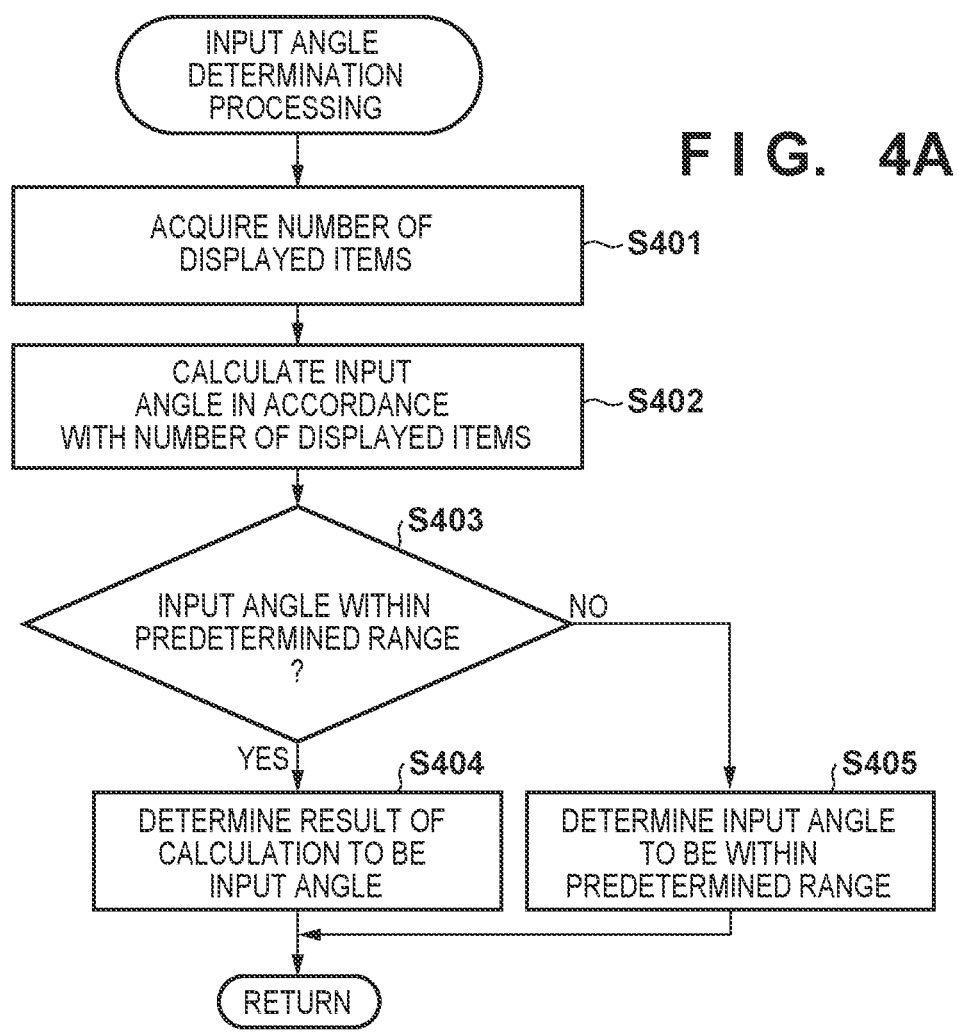
FIGS. 4A and 4B are flowcharts illustrating processing for determining an input angle according to the present embodiment.
Figure 4B:
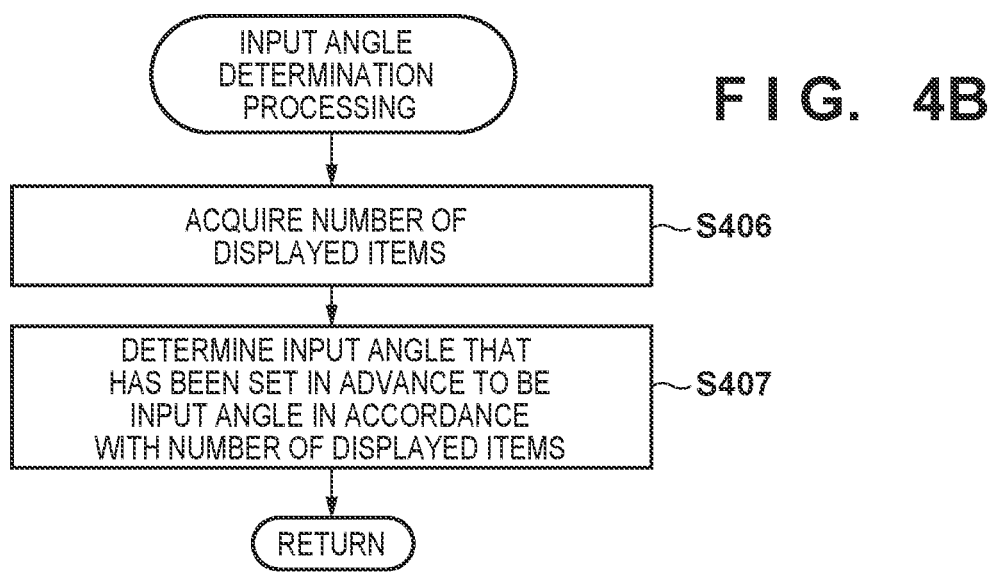

FIGS. 3, 4A, and 4B are flowcharts illustrating the processing for controlling the input angle of the electronic dial 205 of the present embodiment. The processing of FIGS. 3, 4A, and 4B are realized by the system control unit 101 executing a program stored in the non-volatile memory 114 and controlling each of the components of the digital camera 100. Further, the processing of FIGS. 3, 4A, and 4B is started, for example, when the operation mode of the system control unit 101 is set to the reproduction mode and an instruction to display a screen in which a plurality of items (e.g. images, such as thumbnails) are selectably arranged (hereinafter, item selection screen) is inputted.

The input angle control processing according to the present embodiment is executed, for example, when the user selects a desired image by operating the electronic dial 205 in an index reproduction state in which a plurality of images are displayed in a list.

In step S301, the system control unit 101 displays the item selection screen on the display unit 111.

In step S302, the system control unit 101 determines the input angle of the electronic dial 205 based on the number of items displayed on the item selection screen. The processing and method of determining the input angle will be described later with reference to FIGS. 4A and 4B and 5A to 5C. Then, the system control unit 101 transitions to a state in which user operation is awaited.

In step S303, the system control unit 101 determines whether a predetermined operation has been performed and ends the processing when it is determined that the predetermined operation has been performed and advances the processing to step S304 when it is determined that the predetermined operation has not been performed. The predetermined operation is an operation of confirming a currently selected item in response to an operation of the set button 203 or an operation of changing the operation mode in response to an operation of the mode selection dial 118.

In step S304, the system control unit 101 determines whether the number of items displayed on the item selection screen has been changed in response to the enlargement button 207 or the reduction button 208 being operated. The system control unit 101 returns the processing to step S301 when it is determined that the number of items displayed on the item selection screen has been changed, displays the item selection screen with the changed number of items, and determines the input angle. The system control unit 101 advances the processing to step S305 when it is determined that the number of items displayed on the item selection screen has not been changed.

In step S305, the system control unit 101 determines whether the electronic dial 205 has been operated and advances the processing to step S306 when it is determined that the electronic dial 205 has been operated and returns the processing to step S303 when it is determined that the electronic dial 205 has not been operated.

In step S306, the system control unit 101 sets the input angle of the electronic dial 205 to the input angle determined in step S302 and controls the input angle of the electronic dial 205 via the torque control unit 128. Here, the torque control unit 128 may apply a clicking sensation for each input angle of the electronic dial 205, in which case a torque applied to the electronic dial 205 may be of a value that has been set in advance or the user may be select an arbitrary torque.

In step S307, the system control unit 101 detects the angle of rotation of the electronic dial 205 via the torque control unit 128. The torque control unit 128 or the system control unit 101 determines an amount of operation of the electronic dial 205 from the detected angle of rotation and the input angle.

In step S308, the system control unit 101 changes the selected item in accordance with the amount of operation of the electronic dial 205 determined in step S307 and displays the selected item on the display unit 111 in a visually perceivable manner.

The processing of steps S306 and S307 may be executed after the operation of the electronic dial 205 has been detected in step S305 and thereafter has completely stopped, or the operation may be monitored at regular intervals according to a timer and the processing of step S306 and S307 may be executed iteratively until the operation has completely stopped.

FIGS. 4A and 4B are flowcharts illustrating the input angle determination processing in step S302 of FIG. 3.

The input angle determination processing includes first input angle determination processing which is illustrated in FIG. 4A and in which the input angle is dynamically changed based on the number of displayed items or second input angle determination processing which is illustrated in FIG. 4B and in which an input angle that has been set in advance is switched to in accordance with the number of items.

First, the first input angle determination processing will be described with reference to FIG. 4A.

In steps S401 and S402, the system control unit 101 acquires the number of items displayed on the item selection screen and calculates the input angle in accordance with the number of displayed items. The input angle can be calculated by the following methods (1), (2) and (3).

(1) A method of determining the input angle based on the number of displayed items and a predetermined angle such that an operation for all of the items being displayed becomes a predetermined angle (for example, a method of determining the input angle based on the number of displayed items based on the total angle until all of the items being displayed are selected)

(2) A method of relatively determining the input angle based on the number of items, using an angle corresponding to a predetermined number of items as a reference (3) A method of determining the input angle based on coordinates at which the displayed items are rendered Here, in each of the above calculation methods (1), (2), and (3), there are cases where the input angle becomes extremely large or small depending on the number of displayed items. Therefore, the system control unit 101 executes the processing from step S403 to step S405.

In step S403, the system control unit 101 determines whether the input angle calculated in step S402 is within a predetermined range. The system control unit 101 advances the processing to step S404 when it is determined that the input angle calculated in step S402 is within the predetermined range. The system control unit 101 advances the processing to step S405 when it is determined that the input angle calculated in step S402 is outside the predetermined range.

In step S404, the system control unit 101 determines a result of the calculation in step S402 to be the input angle.

In step S405, the system control unit 101 determines the input angle so as to be within the predetermined range. The system control unit 101 sets, for example, an upper limit or lower limit of the predetermined range to be the input angle.

Figure 5A:
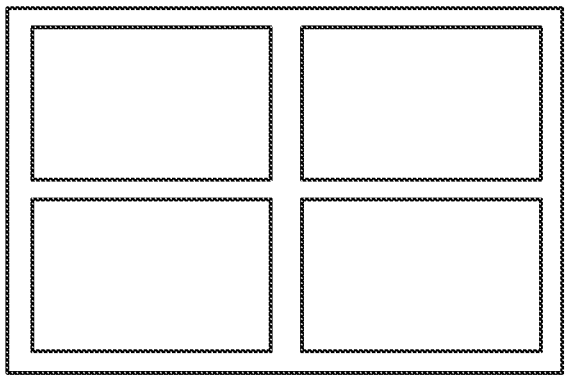
FIGS. 5A to 5C are diagrams illustrating a method of determining an input angle according to the present embodiment.
Figure 5A:
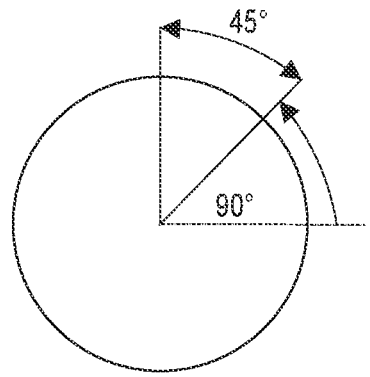
Figure 5B:
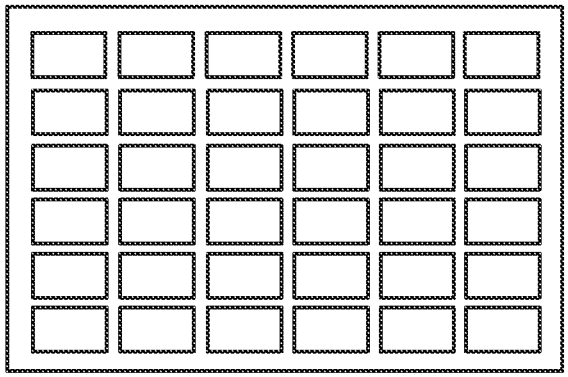
Figure 5B:
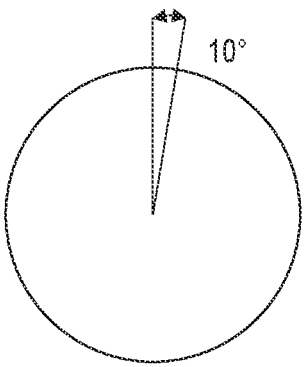
Figure 5C:
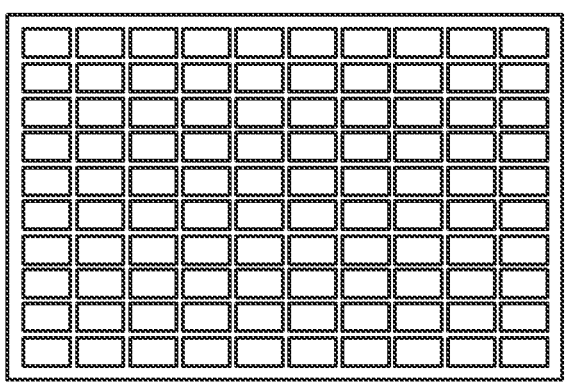
Figure 5C:
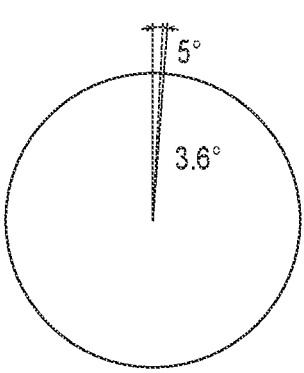

FIGS. 5A to 5C are diagrams illustrating a method of determining the input angle according to the calculation method (1).

FIGS. 5A to 5C illustrates the number of images displayed on the image selection screen displayed on the display unit 111 and the input angle of the electronic dial 205 calculated accordingly as one example of the method of determining the input angle based on the number of displayed items. The image selection screen is, for example, a screen of a list of images displayed during index reproduction.

Hereinafter, a description will be given for an example in which the total angle until all of the displayed images of FIGS. 5A to 5C are selected is set to 360 degrees, the total angle is divided by the number of displayed images, and a range θ of the input angle is set to from 5 degrees to 45 degrees.

As illustrated in FIG. 5A, when the number of displayed images is four, 360 degrees/4=90>θ(45 degrees)

Since the angle exceeds the range θ of the input angle, the input angle is set to 45 degrees, which is an upper limit of the predetermined range.

As illustrated in FIG. 5B, when the number of displayed images is 36, 360 degrees/36=10 degrees Therefore, the input angle is 10 degrees.

As illustrated in FIG. 5C, when the number of displayed images is 100, 360 degrees/100=3.6 degrees<θ(5 degrees)

Since the angle falls below the range θ of the input angle, the input angle is set to 5 degrees, which is a lower limit of the predetermined range.

In the above example, a method of dividing the total angle has been described for the calculation method (1); however, calculation for determining the input angle in relation to a reference index in the calculation methods (1) to (3) is not limited to the illustrated method and may be, for example, index calculation. In addition, the method may be other than the calculation methods (1) to (3). Further, although the image selection screen has been mentioned as an example, the present invention may be applied to an operation of a screen in which an item is selected, such as selection of a setting item.

Next, the second input angle determination processing will be described with reference to FIG. 4B.

In steps S406 and S407, the system control unit 101 acquires the number of items displayed on the item selection screen and determines an input angle that has been set in advance to be the input angle in accordance with the number of displayed items. The input angle that has been set in advance may be determined using the above-described calculation method (1), (2) and (3) or may be an angle for which the input angle corresponding to the number of displayed items has been arbitrarily set.

Next, processing for controlling the input angle, the clicking sensation, and the number of displayed items in accordance with the rotation speed of the electronic dial 205 will be described with reference to FIGS. 6 and 7A to 7C.

Figure 6:
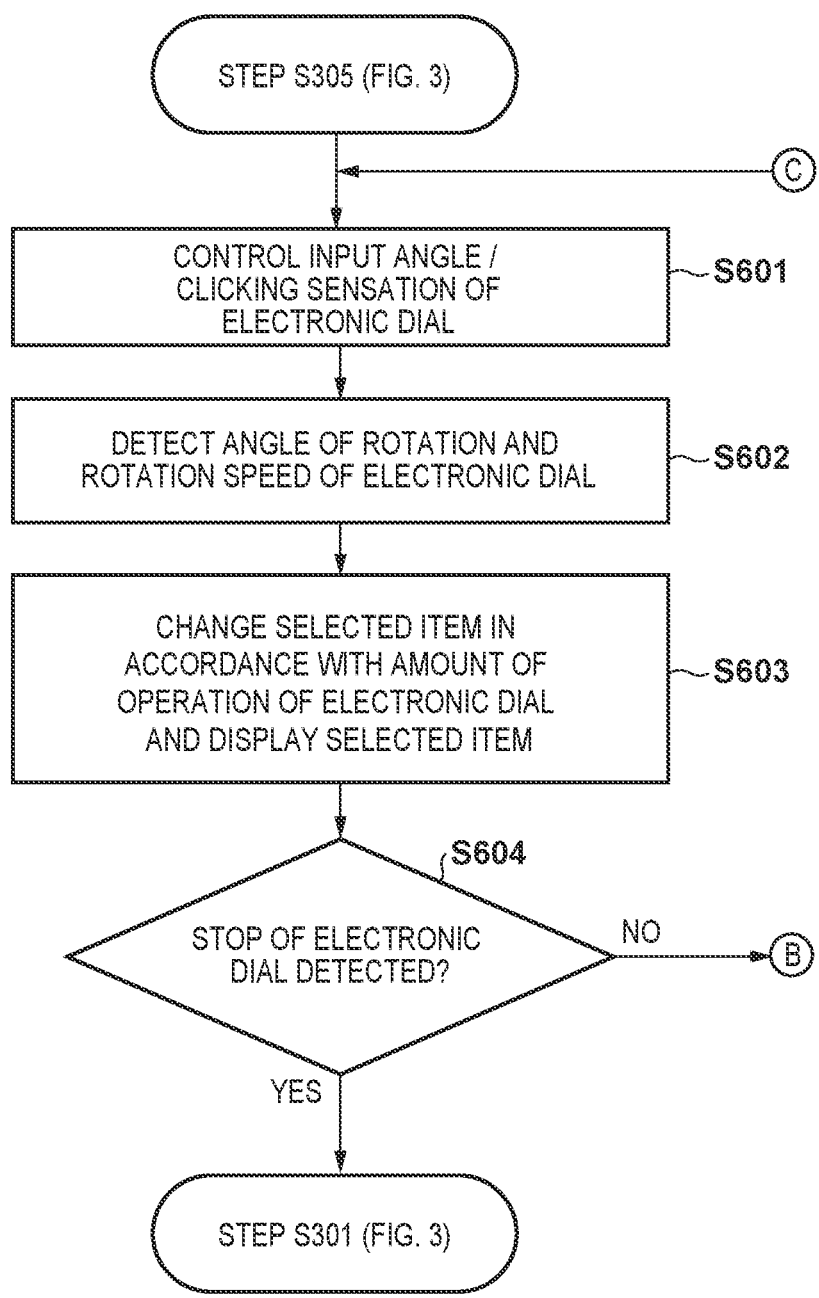
FIG. 6 is a flowchart illustrating processing for control in accordance with a rotation speed of the rotational operation member according to the present embodiment.

The processing of FIG. 6 is executed in replacement of the processing from step S306 to step S308 when the operation of the electronic dial 205 is detected in step S305 of FIG. 3.

The greater the number of displayed items, the smaller the input angle; this may make it difficult for the user to stop the operation at a desired item when selecting an item by rotating the electronic dial 205. Even if the input angle is small, if it is made easy for the user to stop the rotation of the electronic dial 205 when selecting a desired item, operability will be improved. Accordingly, in the present embodiment, it is determined that a desired item is being approached in the user's operation of rotating the electronic dial 205 to select an item when the rotation speed of the electronic dial 205 decreases below a predetermined speed, and the input angle, the clicking sensation, and the number of displayed items are controlled accordingly.

First, the processing of FIG. 6 will be described.

When it is determined in step S305 of FIG. 3 that the electronic dial 205 is operated, the system control unit 101 starts the processing of FIG. 6.

In step S601, the system control unit 101 sets the input angle of the electronic dial 205 to the input angle determined in step S302 and controls the input angle and/or the clicking sensation of the electronic dial 205 via the torque control unit 128.

In step S602, the system control unit 101 detects the angle of rotation and the rotation speed of the electronic dial 205 via the torque control unit 128. The torque control unit 128 or the system control unit 101 determines an amount of operation of the electronic dial 205 based on the detected angle of rotation and the input angle and calculates a rotation speed from the amount of operation and an operation time.

In step S603, the system control unit 101 changes the selected item in accordance with the amount of operation of the electronic dial 205 determined in step S602 and displays the selected item on the display unit 111 in a visually perceivable manner.

In step S604, the system control unit 101 determines whether the operation of the electronic dial 205 has been stopped and advances the processing to step S301 of FIG. 3 when it is determined that the operation has been stopped and returns the processing to step S701 of either FIG. 7A, 7B, or 7C, which will be described later, when it is determined that the operation has not been stopped.

Figure 7A:
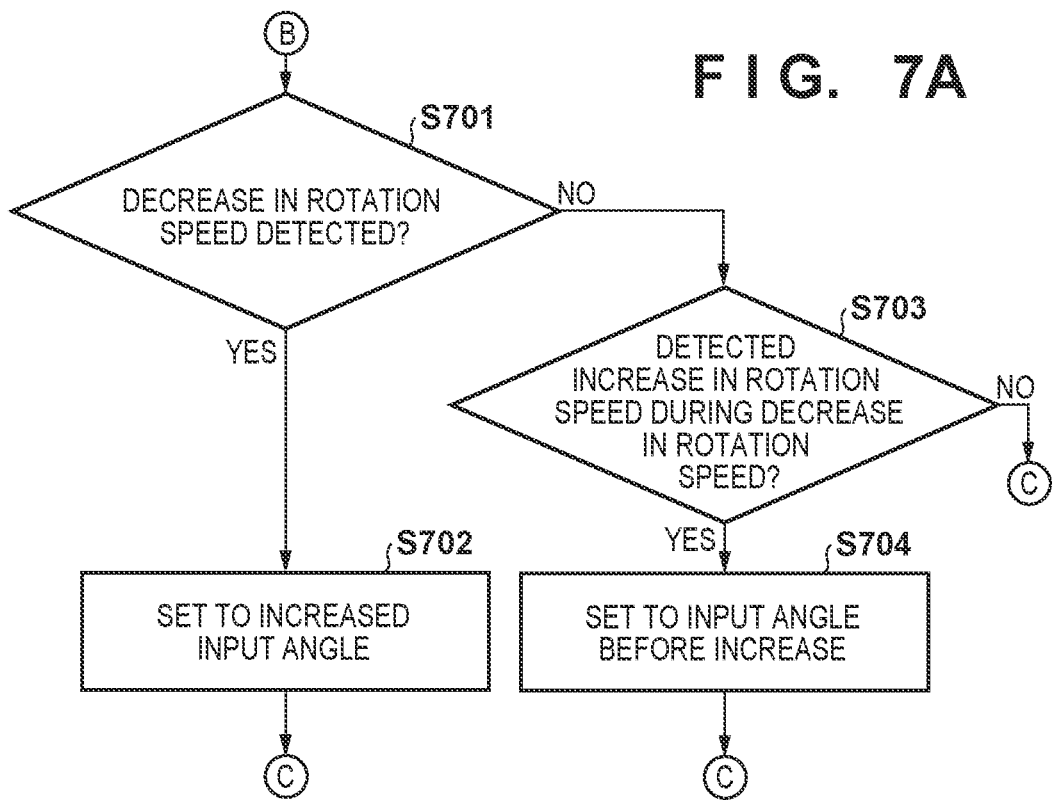
FIGS. 7A to 7C are flowcharts illustrating processing for control in accordance with a rotation speed of the rotational operation member according to the present embodiment.

FIG. 7A is a flowchart illustrating processing for controlling the input angle when the rotation speed of the electronic dial 205 decreases below a predetermined speed.

In step S701, the system control unit 101 determines whether the rotation speed of the electronic dial 205 detected in step S602 has decreased below a predetermined speed. The system control unit 101 advances the processing to step S702 when it is determined that the rotation speed of the electronic dial 205 has decreased below the predetermined speed. The system control unit 101 advances the processing to step S703 when it is determined that the rotation speed of the electronic dial 205 has not decreased below the predetermined speed.

In step S702, the system control unit 101 sets the input angle determined in step S302 to be increased by a predetermined angle, returns the processing to step S601, and controls the input angle of the electronic dial 205 via the torque control unit 128 so as to increase the input angle. The predetermined angle may be changed dynamically according to the number of displayed items or may be an angle that has been set in advance.

In step S703, the system control unit 101 determines whether the rotation speed of the electronic dial 205 has increased during the decrease in the rotation speed detected in step S701. The system control unit 101 advances the processing to step S704 when it is determined that the rotation speed of the electronic dial 205 has increased during the decrease in the rotation speed. The system control unit 101 returns the processing to step S601 when it is determined that the rotation speed of the electronic dial 205 has not increased during the decrease in the rotation speed.

The system control unit 101 is able to predict that a desired item is not approached when the rotation speed of the electronic dial 205 increases during the decrease in the rotation speed; therefore, in step S704, the system control unit 101 causes the input angle that has been increased by the predetermined angle to revert to the input angle before the increase, returns the processing to step S601, and controls the input angle of the electronic dial 205 via the torque control unit 128 to revert to the input angle before the increase.

Figure 7B:
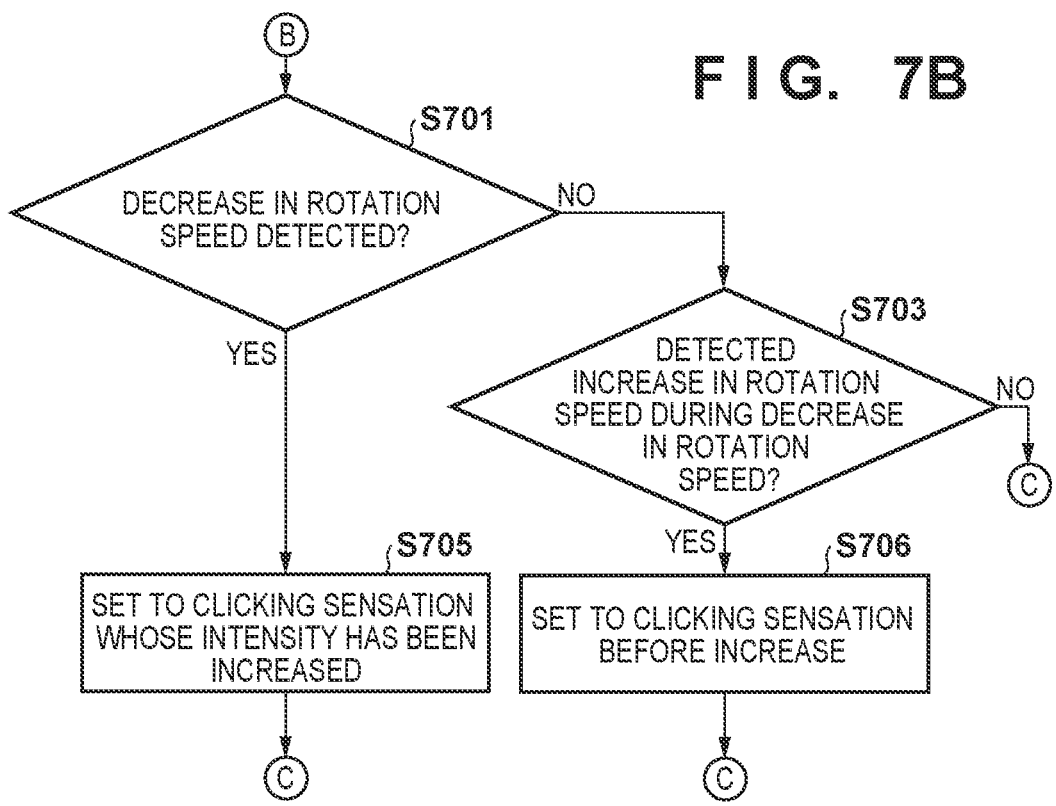

FIG. 7B is a flowchart illustrating processing for controlling the clicking sensation when the rotation speed of the electronic dial 205 decreases below a predetermined speed.

In step S701, the system control unit 101 determines whether the rotation speed of the electronic dial 205 detected in step S602 has decreased below a predetermined speed. The system control unit 101 advances the processing to step S705 when it is determined that the rotation speed of the electronic dial 205 has decreased below the predetermined speed. The system control unit 101 advances the processing to step S703 when it is determined that the rotation speed of the electronic dial 205 has not decreased below the predetermined speed.

In step S705, the system control unit 101 sets an intensity of the current clicking sensation to be increased by a predetermined intensity, returns the processing to step S601, and controls the torque of the electronic dial 205 in the torque control unit 128 so that the clicking sensation increases. The predetermined intensity may be changed dynamically according to the number of displayed items or may be an intensity that has been set in advance.

In step S703, the system control unit 101 determines whether the rotation speed of the electronic dial 205 has increased during the decrease in the rotation speed detected in step S701 predetermined speed. The system control unit 101 advances the processing to step S706 when it is determined that the rotation speed of the electronic dial 205 has increased during the decrease in the rotation speed. The system control unit 101 returns the processing to step S601 when it is determined that the rotation speed of the electronic dial 205 has not increased during the decrease in the rotation speed.

The system control unit 101 is able to predict that a desired item is not approached when the rotation speed of the electronic dial 205 increases during the decrease in the rotation speed; therefore, in step S706, the system control unit 101 causes the intensity of the clicking sensation that has been increased by the predetermined intensity in step S705 to revert to the intensity before the change, returns the processing to step S601, and controls the torque of the electronic dial 205 via the torque control unit 128 to be at the intensity before the increase.

Figure 7C:
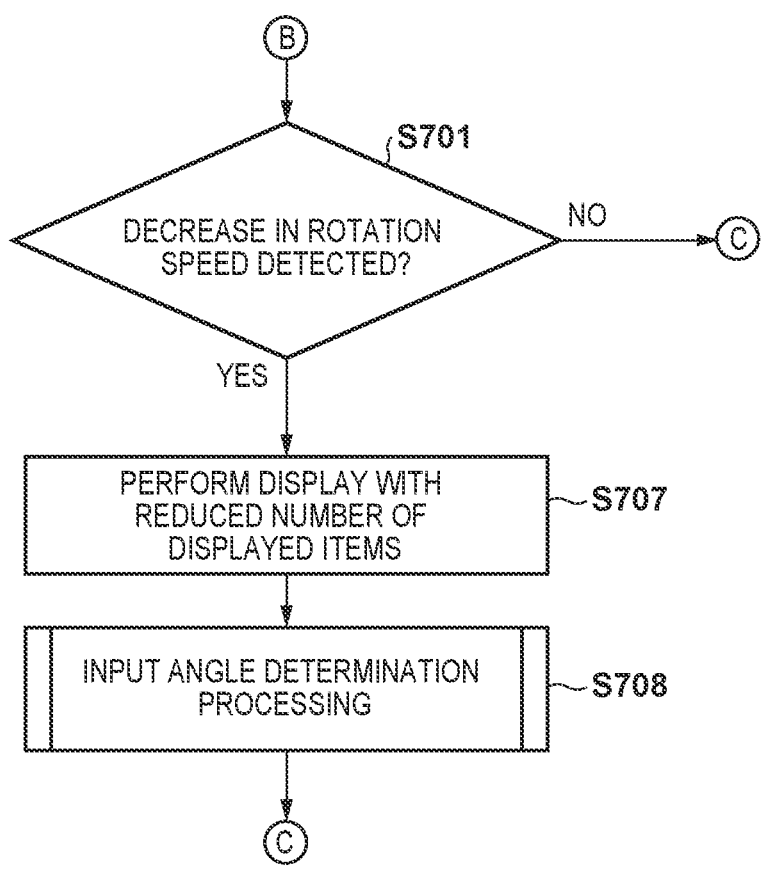

FIG. 7C is a flowchart illustrating processing for controlling the number of displayed items when the rotation speed of the electronic dial 205 decreases below a predetermined speed.

In step S701, the system control unit 101 determines whether the rotation speed of the electronic dial 205 detected in step S602 has decreased below a predetermined speed. The system control unit 101 advances the processing to step S707 when it is determined that the rotation speed of the electronic dial 205 has decreased below the predetermined speed. The system control unit 101 returns the processing to step S601 when it is determined that the rotation speed of the electronic dial 205 has not decreased below the predetermined speed.

In step S707, the system control unit 101 displays the number of items displayed on the item selection screen displayed in step S301 of FIG. 3 in a manner in which the number has been reduced to a predetermined number. The predetermined number is set in a stepwise manner to an even multiple of 2 as illustrated in FIGS. 5A to 5C and may be reduced in a stepwise manner; and the predetermined number may be set to another number of items.

In step S708, the system control unit 101 performs input angle determination processing of FIGS. 4A and 4B, sets the input angle to be an input angle corresponding to the number of displayed items, returns the processing to step S601, and controls the input angle of the electronic dial 205 via the torque control unit 128 such that the input angle is the set input angle.

The above-described processing of FIGS. 7A to 7C may be performed individually, or at least two of the processing may be performed in combination.

According to the above-described embodiment, the input angle of the electronic dial 205 is controlled in accordance with the number of displayed items when selecting a desired item from the item selection screen displayed at the time of index reproduction or the like. As described above, even when the number of displayed items is large, since the input angle of the electronic dial 205 is determined in accordance with the number of displayed items, it is possible to reduce the amount of operation of the electronic dial 205 more than is conventionally possible, and thereby, it is possible to improve the operability of the electronic dial 205 when a desired item is selected from the item selection screen.

According to the above-described embodiment, the input angle of the electronic dial 205 is controlled in accordance with the number of displayed items. In contrast, the input angle of the electronic dial 205 may be controlled in accordance with a type of display screen rather than the number of displayed items. For example, a configuration may be taken so as to, at the time of normal index reproduction, control the input angle of the electronic dial 205 as in the above-described embodiment but, when displaying an index in a reproduction in which it is narrowed down by specification of a condition, such as date, control the input angle differently from the time of normal index display. In this case, a configuration may be taken so as to, at the time of narrowed-down reproduction, control the input angle to be larger than at the time of normal playback since the number of images to be reproduced is smaller than at the time of normal reproduction. Further, a configuration may be taken so as to, at the time of image display, control the input angle of the electronic dial 205 in accordance with the number of displayed images but, at the time of setting screen display, control the input angle of the electronic dial 205 to be constant regardless of the number of icons or displayed setting items.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic device comprising:
a rotational operation member; and
one or more processors configured to function as a control unit configured to control an angle of rotation per operation of the rotational operation member in accordance with a plurality of items displayed on a display unit,
wherein the control unit,
in a case where a plurality of a first type of items are displayed on the display unit, controls the angle of rotation per operation in accordance with the number of displayed items, and
in a case where a plurality of a second type of items are displayed on the display unit, controls the angle of rotation per operation irrespective of the number of displayed items.

2. The electronic device according to claim 1, further comprising:
a display control unit configured to display on the display unit a screen in which the plurality of items are selectably arranged,
wherein the display control unit switches over a currently selected item for each angle of rotation per operation in response to an operation of the rotational operation member.

3. The electronic device according to claim 2, further comprising:
a detection circuit configured to detect an angle at which the rotational operation member is operated,
wherein the display control unit determines an item to be selected based on the angle at which the rotational operation member is operated and the angle of rotation per operation.

4. The electronic device according to claim 1, wherein the control unit sets the angle of rotation per operation to an angle of rotation that has been set in advance, in accordance with the number of the plurality of items displayed on the display unit.

5. The electronic device according to claim 1, wherein the control unit determines the angle of rotation per operation based on the number of items displayed on the display unit and a predetermined angle so that an operation for all the items displayed on the display unit is the predetermined angle.

6. The electronic device according to claim 1, further comprising:
a display control unit configured to change the number of items displayed on the display unit in response to a user operation different from the operation with respect to the rotational operation member.

7. The electronic device according to claim 1, wherein the control unit controls the angle of rotation per operation such that the angle of rotation per operation is within a predetermined range.

8. The electronic device according to claim 1, further comprising:
an applying circuit configured to apply a clicking sensation for each angle of rotation.

9. The electronic device according to claim 1, wherein the electronic device is an image capturing apparatus, and the items are images.

10. The electronic device according to claim 1, wherein the plurality of the first type of items are images that are displayed in a list, and
the plurality of the second type of items are images that are narrowed down by a predetermined condition from among the images to be displayed in the list.

11. The electronic device according to claim 1, wherein the plurality of the first type of items are images, and
the plurality of the second type of items are setting items or icons.

12. The electronic device according to claim 1, wherein the plurality of the first type of items are a plurality of images displayed on the image reproduction screen,
the plurality of the second type of items are a plurality of setting items displayed on the settings screen.

13. The electronic device according to claim 1, wherein in a case where the plurality of the second type of items are displayed on the display unit, the control unit controls the angle of rotation per operation to be constant irrespective of the number of items displayed on the display unit.

14. A method of controlling an electronic device having a rotational operation member, the method comprising:
controlling an angle of rotation per operation of the rotational operation member in accordance with a plurality of items displayed on a display unit,
wherein the controlling,
in a case where a plurality of a first type of items are displayed on the display unit, controls the angle of rotation per operation in accordance with the number of displayed items, and
in a case where a plurality of a second type of items are displayed on the display unit, controls the angle of rotation per operation irrespective of the number of displayed items.

15. The method according to claim 14, further comprising:
displaying on the display unit a screen in which the plurality of items are selectably arranged,
wherein the displaying switches over a currently selected item for each angle of rotation per operation in response to an operation of the rotational operation member.

16. The method according to claim 15, further comprising:
detecting an angle at which the rotational operation member is operated,
wherein the displaying determines an item to be selected based on the angle at which the rotational operation member is operated and the angle of rotation per operation.

17. The method according to claim 14, wherein the controlling sets the angle of rotation per operation to an angle of rotation that has been set in advance, in accordance with the number of the plurality of items displayed on the display unit.

18. The method according to claim 14, wherein the controlling determines the angle of rotation per operation based on the number of items displayed on the display unit and a predetermined angle so that an operation for all the items displayed on the display unit is the predetermined angle.

19. The method according to claim 14, further comprising:
changing the number of items displayed on the display unit in response to a user operation different from the operation with respect to the rotational operation member.

20. The method according to claim 14, wherein the controlling controls the angle of rotation per operation such that the angle of rotation per operation is within a predetermined range.

21. The method according to claim 14, further comprising:
applying a clicking sensation for each angle of rotation.

22. The method according to claim 14, wherein the electronic device is an image capturing apparatus, and the items are images.

23. The method according to claim 14, wherein the plurality of the first type of items are images that are displayed in a list, and
the plurality of the second type of items are images that are narrowed down by a predetermined condition from among the images to be displayed in the list.

24. The method according to claim 14, wherein the plurality of the first type of items are images, and
the plurality of the second type of items are setting items or icons.

25. The method according to claim 14, wherein the plurality of the first type of items are a plurality of images displayed on the image reproduction screen,
the plurality of the second type of items are a plurality of setting items displayed on the settings screen.

26. The method according to claim 14, wherein in a case where the plurality of the second type of items are displayed on the display unit, the controlling controls the angle of rotation per operation to be constant irrespective of the number of items displayed on the display unit.

27. A non-transitory computer-readable storage medium storing a program for causing a processor to function as an electronic device comprising:
a rotational operation member; and
one or more processors configured to function as a control unit configured to control an angle of rotation per operation of the rotational operation member, in accordance with a plurality of items displayed on a display unit,
wherein the control unit,
in a case where a plurality of a first type of items are displayed on the display unit, controls the angle of rotation per operation in accordance with the number of displayed items, and
in a case where a plurality of a second type of items are displayed on the display unit, controls the angle of rotation per operation irrespective of the number of displayed items.

* * * * *